(12) United States Patent
Tanida et al.

(10) Patent No.: US 10,190,691 B2
(45) Date of Patent: Jan. 29, 2019

(54) SEALING DEVICE

(71) Applicant: NOK CORPORATION, Tokyo (JP)

(72) Inventors: Masayuki Tanida, Fukushima (JP);
Masaaki Yagi, Fukushima (JP)

(73) Assignee: NOK CORPORATION, Tokyo (JP)

(*) Notice: Subject to any disclaimer, the term of this patent is extended or adjusted under 35 U.S.C. 154(b) by 0 days.

(21) Appl. No.: 15/669,900

(22) Filed: Aug. 5, 2017

(65) Prior Publication Data

US 2018/0045315 A1 Feb. 15, 2018

(30) Foreign Application Priority Data

Aug. 9, 2016 (JP) ................................. 2016-156205

(51) Int. Cl.
| | | |
|---|---|---|
| *F16J 15/32* | (2016.01) | |
| *F16J 15/3232* | (2016.01) | |
| *F16J 15/3216* | (2016.01) | |
| *F16J 15/16* | (2006.01) | |
| *F16J 15/3264* | (2016.01) | |
| *F16J 15/3296* | (2016.01) | |

(52) U.S. Cl.
CPC ......... *F16J 15/3232* (2013.01); *F16J 15/164* (2013.01); *F16J 15/3216* (2013.01); *F16J 15/3264* (2013.01); *F16J 15/3296* (2013.01)

(58) Field of Classification Search
CPC .. F16J 15/3204; F16J 15/3232; F16J 15/3216; F16J 15/3248; F16J 15/3252; F16J 15/3268
See application file for complete search history.

(56) References Cited

U.S. PATENT DOCUMENTS 7,806,412 B2* 10/2010 Nakagawa ........... F16J 15/3256
277/552

FOREIGN PATENT DOCUMENTS

JP 2006-57825 A 3/2006

* cited by examiner

*Primary Examiner* — Gilbert Y Lee
(74) *Attorney, Agent, or Firm* — Daniel J. Sepanik, Esq.; Harness, Dickey & Pierce, P.L.C.

(57) ABSTRACT

A sealing device between a shaft hole formed on a housing and a rotary shaft, is provided with a rotating seal member fixed to the rotary shaft that rotates integrally with the rotary shaft, and a fixed seal member fixed to an inner surface of the shaft hole. The fixed seal member has a lip contacting the rotary shaft and an axial dust lip contacting the rotating seal member. The rotating seal member is formed by a rigid body, and an opening is formed on the rotating seal member connecting to a space defined by the rotary shaft, the lip and the axial dust lip of the fixed seal member, and the rotating seal member. A deformation member is disposed on the opening of the rotating seal member that has higher elasticity than the rotating seal member, which blocks the opening, and deforms based on the pressure in the space.

4 Claims, 6 Drawing Sheets

SEALING DEVICE

CROSS-REFERENCE TO RELATED APPLICATIONS

This application claims the benefit and priority of Japanese Application No. 2016-156205, filed Aug. 9, 2016. The entire disclosure of the above application is incorporated herein by reference.

FIELD

The present disclosure relates to a sealing device used in an apparatus having a rotary shaft.

BACKGROUND

Conventionally, such sealing device is known, for example, in Japanese Unexamined Patent Application Publication No. 2006-57825. In the sealing device, a sealing structure is known having a rotating seal member 2 known as a deflector, fixed to a rotary shaft 1, and a fixed seal member 4 fixed to an inner surface of a shaft hole 3 in which the rotary shaft 1 is disposed, as illustrated in FIG. 12. The rotating seal member 2 is formed from a rigid body, and the fixed seal member 4 has a compound structure of a rigid body and an elastic body.

This kind of sealing device is used in a driving system unit or other apparatus of a vehicle such as, for example, an automobile. While the fixed seal member 4 mainly seals a lubricant in a machine internal space S, the rotating seal member 2 mainly prevents the infiltration of foreign substances such as mud or dust from the outside of the machine A to the machine internal space S.

The fixed sealing member 4 has a seal lip 4A and a side dust lip 4B that contact the rotary shaft, and an axial dust lip 4C the contacts the rotating seal member 2. The seal lip 4A mainly has the role of sealing lubricant in the machine internal space S, and the dust lips 4B and 4C mainly have the role of preventing the infiltration of foreign substances from the outside of the machine A to the machine internal space S.

SUMMARY

[Problem to be Solved by the Disclosure]

In the conventional sealing device illustrated in FIG. 12, the internal pressure of a space O defined by the rotary shaft 1, the dust lips 4B and 4C of the fixed seal member 4, and the rotating seal member 2 may largely fluctuate. As causes for this pressure fluctuation, for example, a change in the relative positional relationship between the fixed seal member 4 fixed on the shaft hole 3 and the rotating seal member 2 fixed on the rotary shaft 1 accompanying the movement in the thrust direction of the rotary shaft 1 is given. Furthermore, the expansion and contraction of air, and an unexpected change in the relative positional relationship between the fixed seal member 4 and the rotating seal member 2 due to the eccentricity of the fixed seal member 4 to the rotating seal member 2, which accompany temperature change in the space O, are also considered to be causes of pressure fluctuation. Particularly in differential devices where there is a lot of movement in the thrust direction of the rotary shaft, the relative positional relationship between the fixed seal member 4 and the rotating seal member 2 changes considerably, and the internal pressure of the space O fluctuates remarkably.

When the internal pressure of the space O rises, the contact pressure given by the side dust lip 4B to the rotary shaft 1 rises, and the contact pressure given by the axial dust lip 4C to the rotating seal member 2 also rises.

Because of this, there is a risk that the torque given by the entire sealing device to the rotary shaft 1 will rise.

An object of the present disclosure is to provide a sealing device that can appropriately block the outside of the machine A and the machine internal space S, and suppress a rise in torque given to the rotary shaft.

[Means for Solving the Problem]

In light of the above, the sealing device according to the present disclosure is a sealing device that seals between a shaft hole formed on a housing and a rotary shaft, provided with a rotating seal member fixed to the rotary shaft that rotates integrally with the rotary shaft, and a fixed seal member fixed to an inner surface of the shaft hole, wherein the fixed seal member has a lip contacting the rotary shaft and an axial dust lip contacting the rotating seal member, the rotating seal member is formed by a rigid body, an opening is formed on the rotating seal member connecting to a space defined by the rotary shaft, the lip and the axial dust lip of the fixed seal member, and the rotating seal member, and a deformation member is disposed on the opening of the rotating seal member that has higher elasticity than the rotating seal member, blocks the opening, and deforms based on the pressure in the space.

In this sealing device, the deformation member is disposed on the opening formed on the rotating seal member, and the deformation member deforms based on the pressure in the space defined by the rotary shaft, the lip and the axial dust lip of the fixed seal member, and the rotating seal member. Therefore, a rise in pressure in the space is softened, and a rise in torque given to the rotary shaft as a result of this rise in pressure is softened.

It is preferable for the opening to be formed on a position not blocked by the rotary shaft. In this configuration, the deformation member disposed on the opening deforms without being hindered by the rotary shaft.

It is preferable for the rotating seal member to have an inner side tube portion fixed to the rotary shaft, an outer side tube portion disposed on an outer side of the inner side tube portion, and a side wall portion that connects the inner side tube portion and the outer side tube portion, the opening to be formed on the side wall portion, and the deformation member to be stretched from the inner circumferential surface of the inner side tube portion across the outer circumferential surface of the outer side tube portion. In this configuration, the contact surface area of the deformation member and the rotating seal member is largely secured, and the adhesion between the two can also be highly secured. In other words, the deformation member is difficult to be peeled, particularly fatigue-peeled, from the rotating seal member, and the life of the sealing device can be made longer. Furthermore, the adhesion between the inner side tube portion and the rotary shaft is improved by the deformation member being disposed on the inner circumferential surface of the inner side tube portion, and the sealing ability can be improved.

It is preferable for at least the portion of the deformation member covering the opening to be bellows-shaped. In this case, it is easy for the deformation member to expand based on a rise in pressure in the space, and the rise in pressure in the space can be effectively suppressed.

[Effect of the Disclosure]

In the present disclosure, the deformation member is disposed on the opening formed on the rotating seal member, and the deformation member deforms based on the pressure in the space defined by the rotary shaft, the lip and the axial dust lip of the fixed seal member, and the rotating seal member. Therefore, a rise in pressure in the space is suppressed, and a rise in torque given to the rotary shaft as a result of this rise in pressure is softened. This effect is particularly advantageous when the sealing device according to the present disclosure is used in a differential device where there is a lot of movement in the thrust direction of the rotary shaft because the relative positional relationship of the fixed seal member and the rotating seal member changes considerably.

DRAWINGS

DETAILED DESCRIPTION

Various embodiments according to the present disclosure will be described below referring to drawings.

First Embodiment

Figure 1:
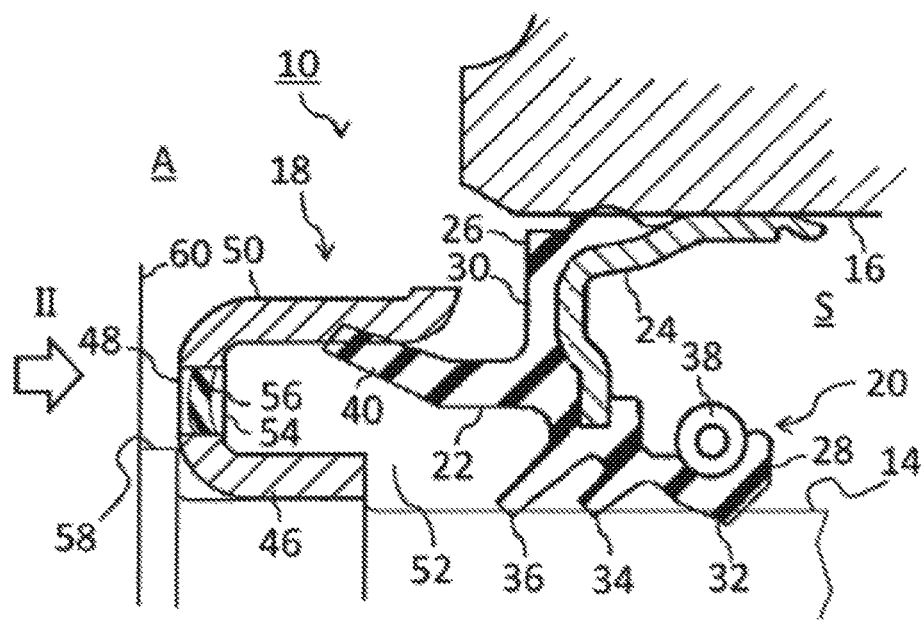
FIG. 1 is a cross-sectional diagram of a sealing device according to the first embodiment of the present disclosure.

FIG. 1 is a diagram according to the first embodiment of the present disclosure, and illustrates a sealing device used in an apparatus having a rotary shaft, for example, a driving system unit of a vehicle such as an automobile (for example, transmission, transfer device, differential device).

This sealing device 10 seals between a rotary shaft 14 and the inner surface of a shaft hole 16 formed on a housing in which the rotary shaft 14 is inserted and disposed, and prevents or reduces fluid from leaking from a machine internal space S to outside the machine A. The rotary shaft 14 is substantially cylindrical, the shaft hole 16 is circle shaped in a cross-section, and the sealing device 10 is substantially ring-shaped, but only the upper-side portions thereof are illustrated in FIG. 1.

The sealing device 10 is an assembly that is a combination of a rotating seal member 18 called a deflector that rotates integrally with the rotary shaft 14 fixed to the rotary shaft 14, and a fixed seal member 20 fixed to the inner surface of the shaft hole 16. The rotating seal member 18 and the fixed seal member 20 seal lubricant in the machine internal space S cooperating with each other. However, while the fixed seal member 20 mainly seals lubricant in the machine internal space S, the rotating seal member 18 mainly prevents the infiltration of foreign substances such as mud or dust from the outside of the machine A to the machine internal space S.

The fixed seal member 20 has an elastic body, for example, an elastic ring 22 formed by an elastomer, and a rigid body that reinforces the elastic ring 22, for example, a metal reinforcing ring 24 having a cross-section that is substantially L-shaped. The reinforcing ring 24 has one portion thereof embedded in the elastic ring 22, and is adhered to the elastic ring 22. In other words, the fixed seal member 20 has a compound structure made up of the elastic ring 22 and the reinforcing ring 24.

In the drawings, the fixed seal member 20 is illustrated in a state in which it is not installed on the apparatus, and in which it is not receiving any external force. However, when the fixed seal member 20 is actually installed on the apparatus, the portion of the elastic ring 22 (for example, seal lip 32, side dust lips 34 and 36, and axial dust lip 40 described hereinafter) is deformed by receiving a reaction force from a contacting member.

The fixed seal member 20 has an outer side ring body 26 fixed on the shaft hole 16, an inner side ring body 28 on the inner side of the radial direction of the outer side ring body 26, and a side wall 30 that connects the outer side ring body 26 and the inner side ring body 28. The outer side ring body 26 is a portion configured by the elastic ring 22 and the reinforcing ring 24, the side wall 30 is also a portion configured by the elastic ring 22 and the reinforcing ring 24, and the inner side ring body 28 is a portion configured only by the elastic ring 22.

The outer ring body 26 is the outer side seal portion fixed to the inner circumferential surface of the shaft hole 16. The fixing method is not limited, but may be, for example, carried out by close-fit. The portion of the reinforcing ring 24 extending to the left and right in FIG. 2, or in other words, the tube-shaped portion is inserted into the shaft hole 16. One portion of the elastic ring 22 is disposed on the outer side of a portion of the tube-shape of the reinforcing ring 24, and the reinforcing ring 24 strongly presses this portion of the elastic ring 22 against the inner circumferential surface of the shaft hole 16.

The fixed seal member 20 has the seal lip 32 and the side dust lips 34 and 36 that protrude to the inner side in the radial direction of the inner side ring body 28. The seal lip 32 and the side dust seal lips 34 and 36 are all formed by only elastic bodies. While the seal lip 32 is a projection connected to the circumferential direction and has two tilted surfaces, the side dust lips 34 and 36 are thin plate-shaped circular rings expanding diagonally to the outside of the machine A aligned together.

The seal lip 32 and side dust lips 34 and 36 all contact the outer circumferential surface of the rotary shaft 14. When the rotary shaft 14 rotates, the seal lip 32 and the side dust lips 34 and 36 all slide relatively with respect to the rotary shaft 14. However, the seal lip 32 mainly has the role of sealing lubricant in the machine internal space S, the side dust lips 34 and 36 mainly have the role of preventing the infiltration of foreign substances from the outside of the machine A to the machine internal space S.

A garter spring 38 is wound around the inner side ring body 28 for compressing the inner side ring body 28 to the inner side in the radial direction. A receiving groove that receives the garter spring 38 is formed on the inner side ring body 28. The garter spring 38 applies a force to the seal lip 32 that presses the seal lip 32 to the rotary shaft 14.

Furthermore, the fixed seal member 20 has an axial dust lip 40 that extends from the side wall 30 to the outside of the machine A and to the outer side in the radial direction. The axial dust lip 40 contacts the inner circumferential surface of an outer side tube portion 50 of the rotating seal member 18.

The rotating seal member 18 is formed by a rigid body, for example, metal. The rotating seal member 18 has an inner side tube portion 46 fixed to the rotary shaft 14, an outer side tube portion 50 disposed on the outer side of the inner side tube portion 46, and a side wall portion 48 that connects the inner side tube portion 46 and the outer side tube portion 50. As described above, the rotating seal member 18 mainly prevents the infiltration of foreign substances such as mud or dust from the outside of the machine A to the machine internal space S. Specifically, the rotating seal member 18 rotates integrally with the rotary shaft 14, and drives away foreign substances. The axial dust lip 40 of the fixed seal member 20 contacts the inner circumferential surface of the outer side tube portion 50 of the rotating seal member 18, and mainly has the role of preventing the infiltration of foreign substances from the outside of the machine A to the machine internal space S.

The rotary shaft 14, the side dust lip 36 and the axial dust lip 40 of the fixed seal member 20, and the rotating seal member 18 define a space 52. An opening 54 that connects to the space 52 is formed on the side wall portion 48 of the rotating seal member 18. A deformation member 56 is disposed on the opening 54 of the rotating seal member 18 that has higher elasticity than the rotating seal member 18, blocks the opening 54, and deforms based on the pressure in the space 52.

When there is no opening 54, the pressure in the space 52 may fluctuate largely.

When the pressure in the space 52 rises, the contact pressure given by the side dust lip 36 to the rotary shaft 14 rises, and the contact pressure given by the axial dust lip 40 to the rotating seal member 18 also rises. Because of this, there is concern that the torque given by the entire sealing device to the rotary shaft 14 will rise.

However, according to this embodiment, the deformation member 56 provided on the opening 54 deforms based on the pressure in the space 52. Therefore, a rise in pressure in the space 52 is suppressed, and a rise in torque given to the rotary shaft 14 as a result of the rise in pressure is suppressed. This effect is particularly advantageous when the sealing device 10 is used in a differential device where there is a lot of movement in the thrust direction of the rotary shaft 14 because the relative positional relationship of the fixed seal member 20 and the rotating seal member 18 changes drastically.

From the above perspective, it is preferable for the deformation member 56 to be easier to deform than the side dust lip 36 and the axial dust lip 40 when the pressure in the space 52 rises. Furthermore, it is preferable for the deformation member 56 to have a strength and water resistance to not be damaged as much as possible by foreign substances such as mud and dust. It can be said that these characteristics are also in the deformation member of other embodiments described hereinafter.

Elastomers such as ethylene propylene rubber (EPDM), nitrile rubber (NBR), hydrogenated nitrile rubber (HNBR), fluorine rubber (FKM) and the like, and resins such as polyethylene, polyvinyl chloride and the like, are examples of materials for the deformation member 56. The deformation member 56 is preferably film-shaped, and the thickness thereof is designed considering the elasticity, strength, and the like of the materials. It can be said that these characteristics are also in the deformation member of the other embodiments described hereinafter.

As a method for providing the deformation member 56 on the opening 54, for example, the deformation member 56 may be adhered to the periphery of the opening 54 using an adhesive. Alternatively, the deformation member 56 may be joined to the periphery of the opening 54 using a cross-link of materials of the deformation member 56. Alternatively, the rotating seal member 18 may be disposed in-mold, and the material of the deformation member 56 may be filled in this mold, and if necessary, the material of the deformation member 56 may be crosslinked. If appropriate, it can be said that these methods are also in the deformation member of the other embodiments described hereinafter.

It is preferable that the opening 54 is formed on a position not sealed by the rotary shaft 14 so that the deformation member 56 disposed on the opening 54 can be deformed without being hindered by the rotary shaft 14. In this embodiment illustrated in FIG. 1, the rotary shaft 14 has a step portion 58 and a flange 60. The side wall portion 48 of the rotating seal member 18 is separated from the flange 60 in the axial direction of the rotary shaft 14, and is separated from the outer circumferential surface of the step portion 58 in the radial direction of the rotary shaft 14. Because of this, the deformation member 56 disposed on the opening 54 can be deformed without being hindered by the step portion 58 or flange 60 of the rotary shaft 14 along with the rise in pressure in the space 52.

Figure 2:
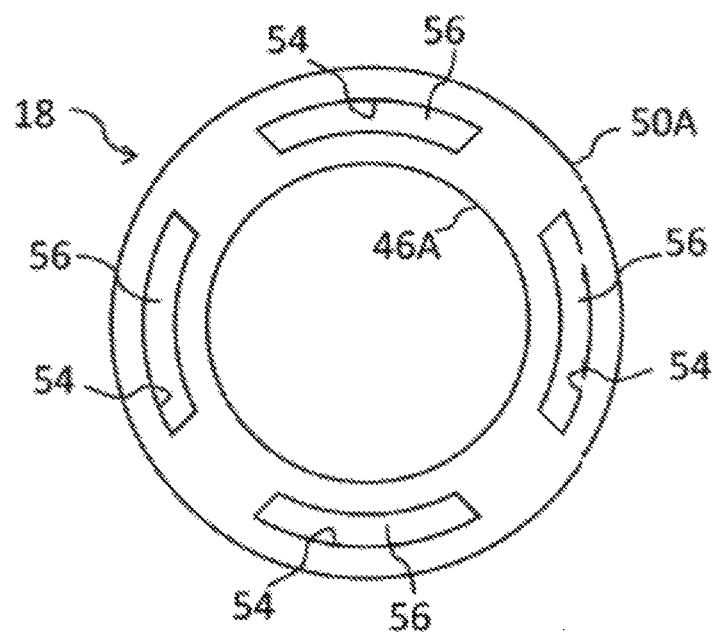
FIG. 2 is a frontal view of a rotating seal member of the sealing device viewed along arrow II in FIG. 1.

FIG. 2 is a frontal view of the rotating seal member 18 viewed along the arrow II of FIG. 1. In FIG. 2, numeral 50A illustrates the outer circumferential surface of the outer side tube portion 50 of the rotating seal member 18, and numeral 46A illustrates the inner circumferential surface of the inner side tube portion 46. As illustrated in FIG. 2, four openings 54 and four deformation members 56 are provided, and the openings 54 and the deformation members 56 are fan-shaped.

Figure 3:
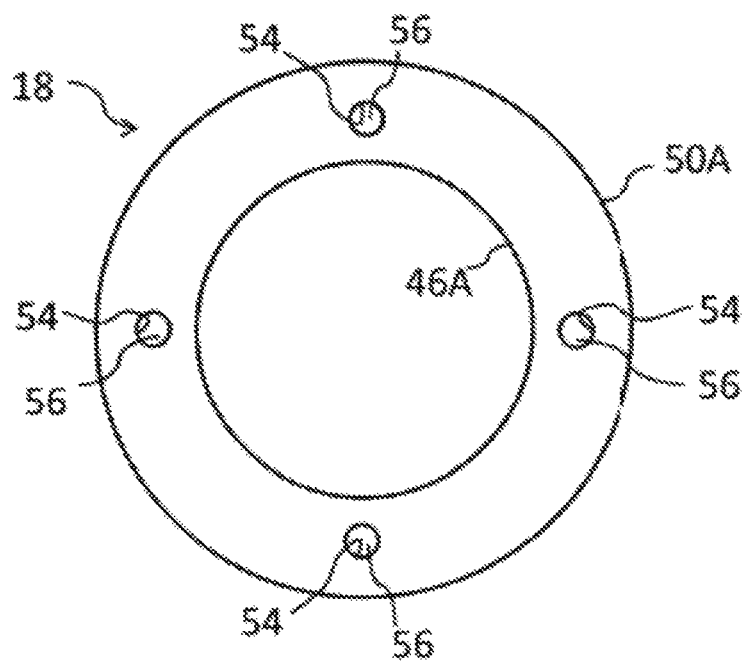
FIG. 3 is a frontal view of the rotating seal member according to a variation.

FIG. 3 is a frontal view of the rotating seal member 18 according to a variation. In this variation, four openings 54 and four deformation members 56 are provided, and the openings 54 and the deformation members 56 are circular.

However, the number of openings 54 and the number of deformation members 56 are not limited, and may, for example, be one. Furthermore, the shape, size, and gaps of the opening 54 and the deformation member 56 are not limited.

In the other embodiments (except the sixth embodiment illustrated in FIG. 8) described hereinafter, the openings 54 illustrated in FIG. 2 and FIG. 3 may be used. Furthermore, the number, shape, size, and gaps of the opening 54 are not limited in these embodiments.

Second Embodiment

Figure 4:
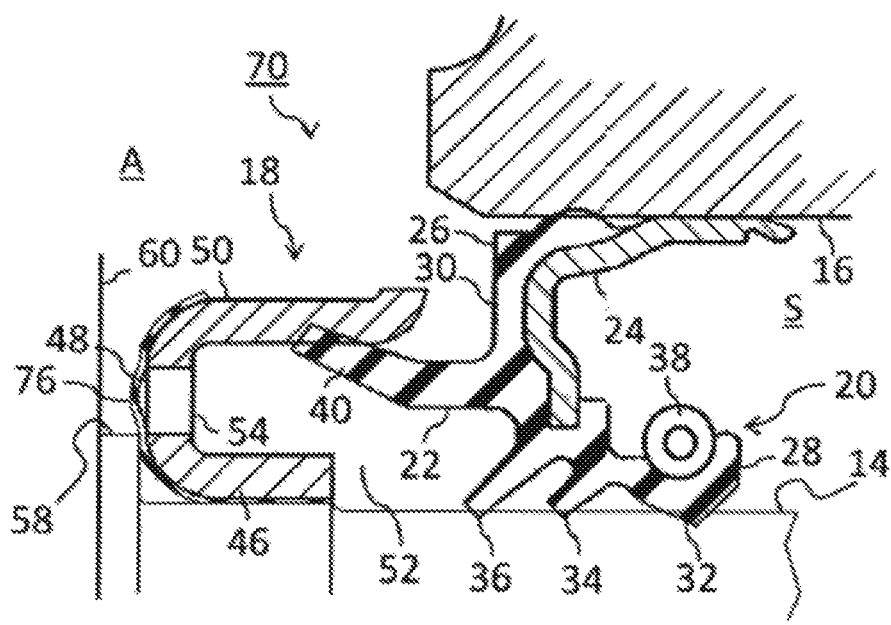
FIG. 4 is a cross-sectional diagram of a sealing device according to the second embodiment of the present disclosure.

FIG. 4 illustrates a sealing device 70 according to the second embodiment of the present disclosure. In the drawings of FIG. 4 and after, the same numerals are used to illustrate components in common with the first embodiment, and detailed descriptions of such components will not be given.

In this sealing device 70, a deformation member 76 is provided on the opening 54 replacing the deformation member 56. As in the first embodiment, the deformation member 76 provided on the opening 54 deforms based on the internal pressure of the space 52. Therefore, a rise in pressure in the space 52 is suppressed, and a rise in torque given to the rotary shaft 14 as a result of the rise in pressure is suppressed.

The deformation member 76 is stretched from the inner circumferential surface of the inner side tube portion 46 of the rotating seal member 18 across the outer circumferential surface of the outer side tube portion 50, covering the opening 54. In this configuration, the contact surface area of the deformation member 76 and the rotating seal member 18 is largely secured, and the adhesion between the two can also be highly secured. In other words, the deformation member 76 is difficult to be peeled, particularly fatigue peeled, from the rotating seal member 18, and the life of the sealing device 76 can be made longer. Furthermore, the adhesion between the inner side tube portion 46 and the rotary shaft 14 is improved by the deformation member 76 being disposed on the inner circumferential surface of the inner side tube portion 46, and the sealing ability can be improved.

Third Embodiment

Figure 5:
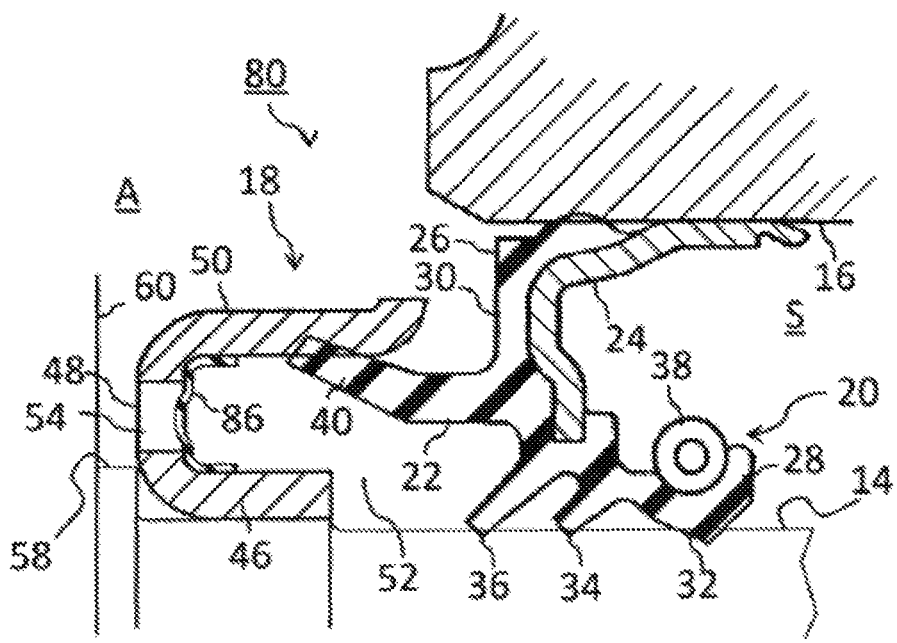
FIG. 5 is a cross-sectional diagram of a sealing device according to the third embodiment of the present disclosure.

FIG. 5 illustrates a sealing device 80 according to the third embodiment of the present disclosure. In this sealing device 80, a deformation member 86 is provided on the opening 54 replacing the deformation member 56. As in the first embodiment, the deformation member 86 provided on the opening 54 deforms based on the internal pressure of the space 52. Therefore, a rise in pressure in the space 52 is suppressed, and a rise in torque given to the rotary shaft 14 as a result of the rise in pressure is suppressed.

The deformation member 86 is stretched from the outer circumferential surface of the inner side tube portion 46 of the rotating seal member 18 across the inner circumferential surface of the outer side tube portion 50, covering the opening 54. In this configuration, the contact surface area of the deformation member 86 and the rotating seal member 18 is largely secured, and the adhesion between the two can also be highly secured. In other words, the deformation member 86 is difficult to be peeled, particularly fatigue peeled, from the rotating seal member 18, and the life of the sealing device 86 can be made longer.

However, it is preferable for the deformation member 86 to be disposed on a position not contacting a tip end of the axial dust lip 40 of the fixed seal member 20 along with the movement of the thrust direction of the rotary shaft 1. Therefore, it is not necessary for the deformation member 86 to extend to the inner circumferential surface of the outer side tube portion 50, and the function can be achieved as long as the deformation member 86 covers at least the opening 54.

Fourth Embodiment

Figure 6:
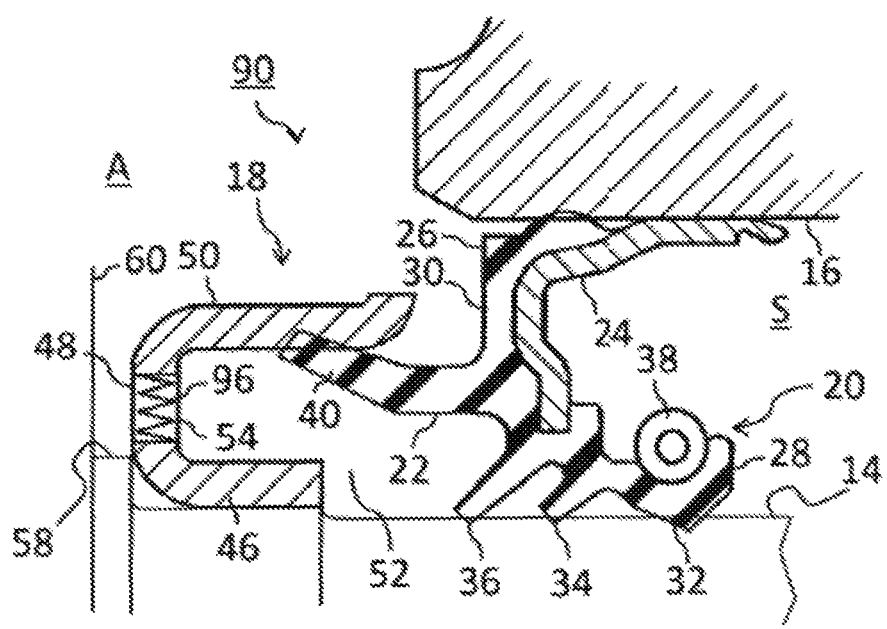
FIG. 6 is a cross-sectional diagram of a sealing device according to the fourth embodiment of the present disclosure.

FIG. 6 illustrates a sealing device 90 according to the fourth embodiment of the present disclosure. In this sealing device 90, a deformation member 96 is provided on the opening 54 replacing the deformation member 56. As in the first embodiment, the deformation member 96 provided on the opening 54 deforms based on the internal pressure of the space 52. Therefore, a rise in pressure in the space 52 is suppressed, and a rise in torque given to the rotary shaft 14 as a result of the rise in pressure is suppressed.

The deformation member 96 is formed by a film, and is bellows-shaped. Therefore, it is easy for the deformation member to expand based on a rise in pressure in the space 52, and the rise in pressure in the space 52 can be effectively suppressed.

The materials of the deformation member 96 can be selected from the same materials as in the deformation member 56 of the first embodiment. The thickness of the deformation member 96 is designed considering the elasticity, strength of the materials, and the like. As a method for providing the deformation member 96 on the opening 54, for example, the deformation member 96 may be adhered to the periphery of the opening 54 using an adhesive. Alternatively, the deformation member 96 may be joined to the periphery of the opening 54 using a cross-link of materials of the deformation member 96.

Fifth Embodiment

Figure 7:
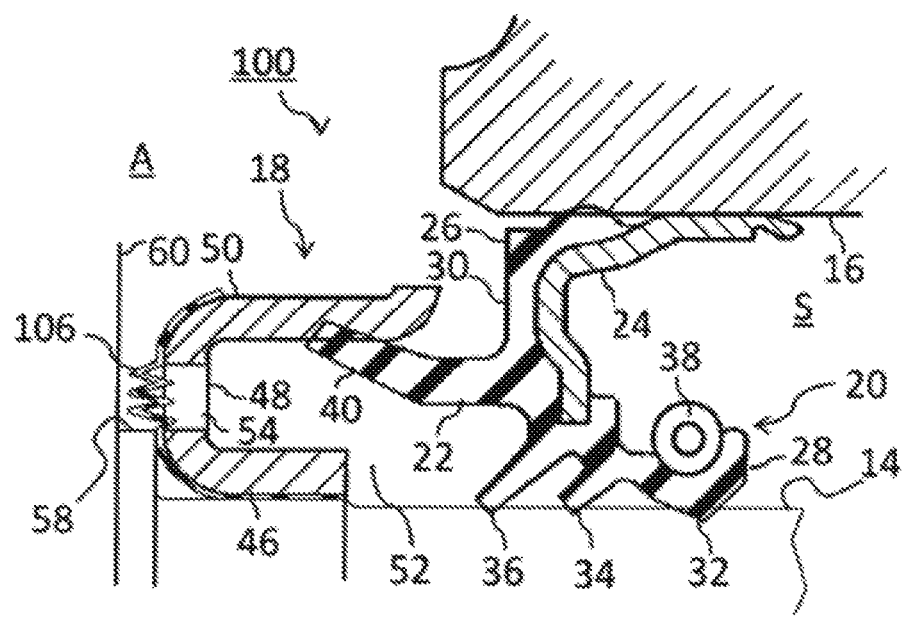
FIG. 7 is a cross-sectional diagram of a sealing device according to the fifth embodiment of the present disclosure.

FIG. 7 illustrates a sealing device 100 according to the fifth embodiment of the present disclosure. In this sealing device 100, a deformation member 106 is provided on the opening 54 replacing the deformation member 56. As in the first embodiment, the deformation member 106 provided on the opening 54 deforms based on the internal pressure of the space 52. Therefore, a rise in pressure in the space 52 is suppressed, and a rise in torque given to the rotary shaft 14 as a result of the rise in pressure is suppressed.

The deformation member 106 is stretched from the inner circumferential surface of the inner side tube portion 46 of the rotating seal member 18 across the outer circumferential surface of the outer side tube portion 50. Furthermore, the deformation member 106 is formed by a film, and the portion corresponding to the opening 54 is bellows-shaped. In other words, the deformation member 106 is a combination of the deformation member 76 in the second embodiment (FIG. 4) and the deformation member 96 in the fourth embodiment (FIG. 6). Therefore, this embodiment has the effects of the second and fourth embodiment.

Sixth Embodiment

Figure 8:
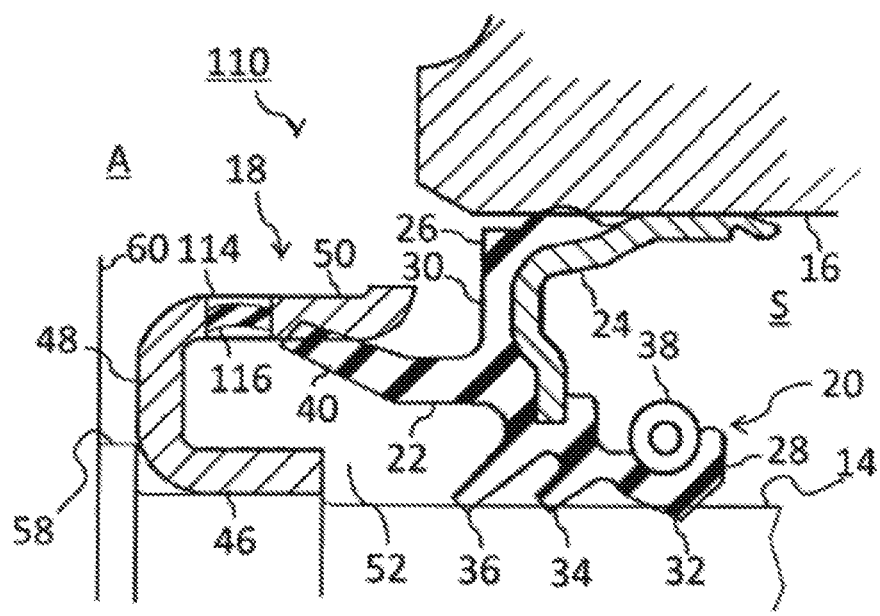
FIG. 8 is a cross-sectional diagram of a sealing device according to the sixth embodiment of the present disclosure.

FIG. 8 illustrates a sealing device 110 according to the sixth embodiment of the present disclosure. In this sealing device 110, no opening is provided on the side wall portion 48 of the rotating seal member 18 and an opening 114 is formed on the outer side tube portion 50 replacing this. The opening 114 connects to the space 52. A deformation member 116 is disposed on the opening 114, has higher elasticity than the rotating seal member 18, blocks the opening 114, and deforms based on the pressure in the space 52.

As in the first embodiment, the deformation member 116 provided on the opening 114 deforms based on the internal pressure of the space 52. Therefore, a rise in pressure in the space 52 is suppressed, and a rise in torque given to the rotary shaft 14 as a result of the rise in pressure is suppressed. In this embodiment, it is possible to dispose the opening 114 on a position not blocked by the rotary shaft 14 hardly effecting the shape of the rotary shaft 14, and the deformation member 116 disposed on the opening 114 deforms without being hindered by the rotary shaft 14 (for example, the flange 60).

Seventh Embodiment

Figure 9:
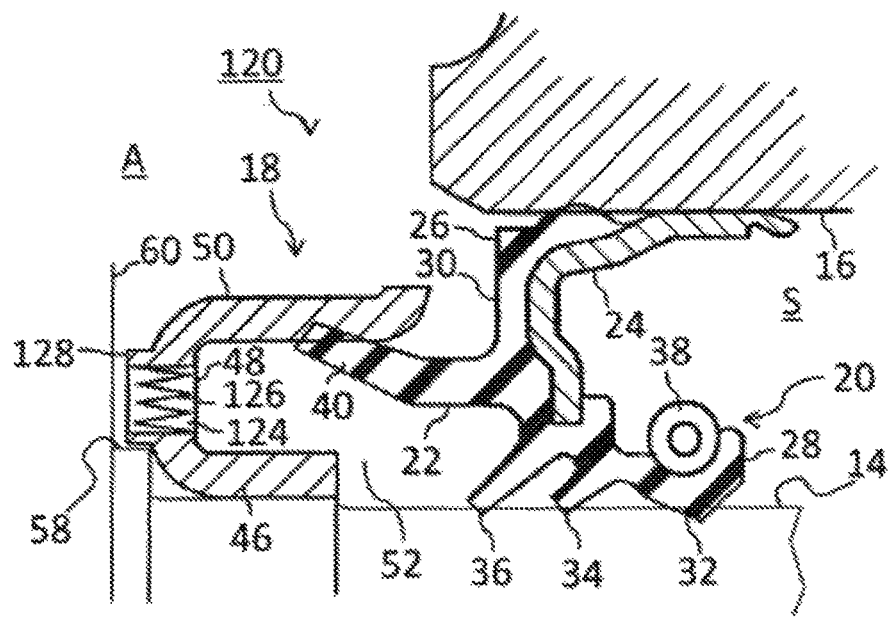
FIG. 9 is a cross-sectional diagram of a sealing device according to the seventh embodiment of the present disclosure.

FIG. 9 illustrates a sealing device 120 according to the seventh embodiment of the present disclosure. In this sealing device 120, a bellows-shaped deformation member 126 formed by a film is disposed on an opening 124 provided on the side wall portion 48. To widen the contact surface area between the deformation member 126 and opening 124, a projecting wall 128 is formed around the opening 124. By widening the contact surface area between deformation member 126 and the opening 124, the adhesion between the two can be highly ensured. In other words, the deformation member 126 is difficult to be peeled, particularly fatigue peeled, from the opening 124 of the rotating seal member 18, and the life of the sealing device 120 can be made longer.

The materials of the deformation member 126 can be selected from the same materials as in the deformation member 56 of the first embodiment. The thickness of the deformation member 126 is designed considering the elasticity, strength of the materials, and the like. As a method for providing the deformation member 126 on the opening 124, for example, the deformation member 126 may be adhered to the periphery of the opening 124 using an adhesive. Alternatively, the deformation member 126 may be joined to the periphery of the opening 124 using a cross-link of materials of the deformation member 126.

Eighth Embodiment

Figure 10:
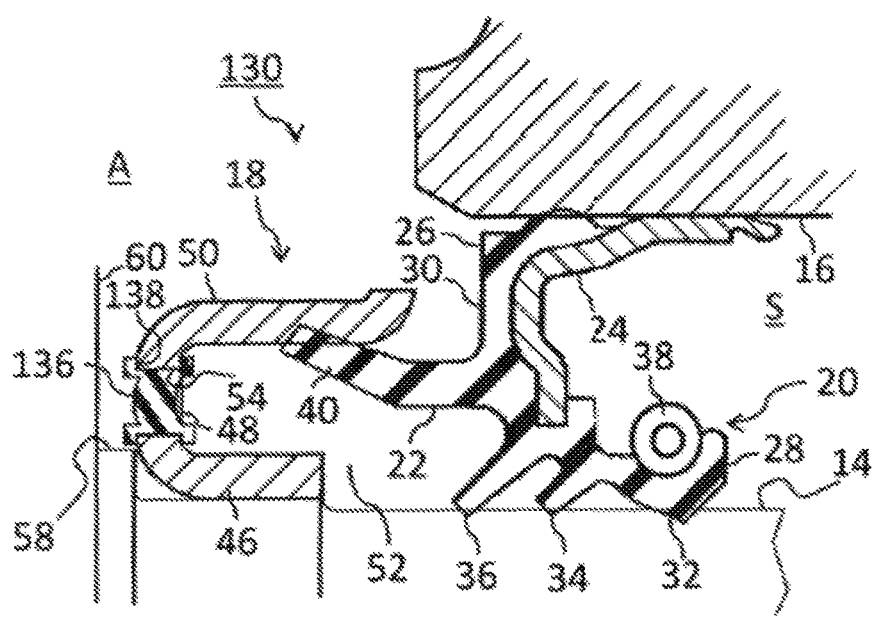
FIG. 10 is a cross-sectional diagram of a sealing device according to the eighth embodiment of the present disclosure.

FIG. 10 illustrates a sealing device 130 according to the eighth embodiment of the present disclosure. In this sealing device 130, a deformation member 136 is disposed on the opening 54 of the side wall portion 48 of the rotating seal member 18. The peripheral portion of the deformation member 136 has a thickness larger the other portions of the deformation member 136, and a groove 138 having the peripheral portion inlayed therein of the opening 54 is formed on the peripheral portion. By the peripheral portion of the opening 54 being inlayed into the groove 138 of the peripheral portion of the deformation member 136, the deformation member 136 is hard to be separated from the rotating seal member 18, and the life of the sealing device 130 can be made longer.

Figure 11:
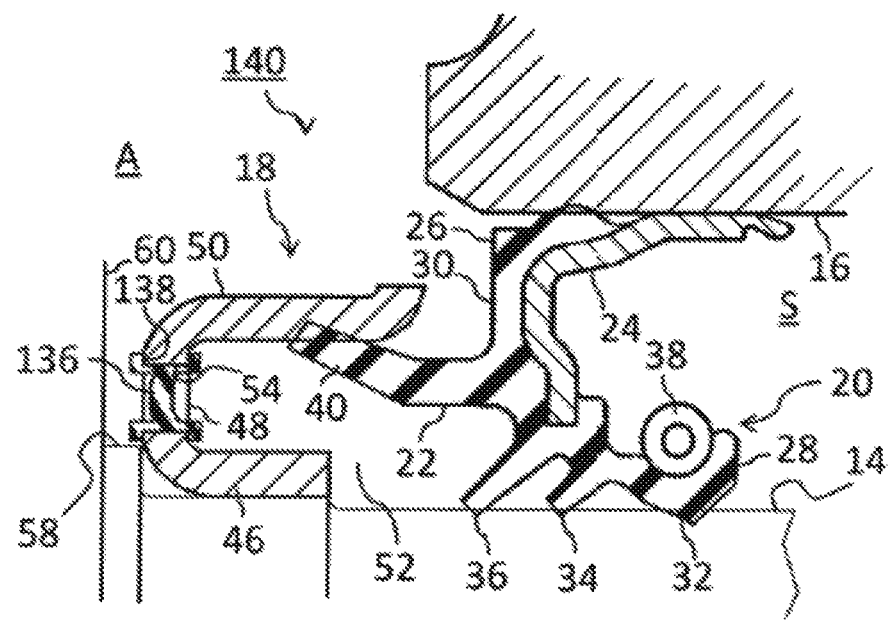
FIG. 11 is a cross-sectional diagram of a sealing device according to a variation of the eight embodiment of the present disclosure.
Figure 12:
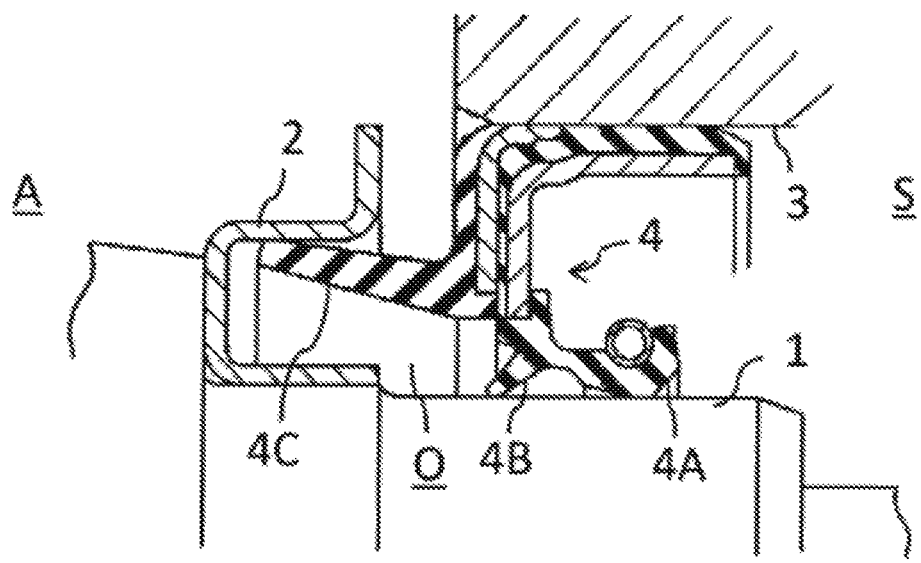
FIG. 12 is a cross-sectional diagram of one example of a conventional sealing device.

FIG. 11 illustrates a sealing device 140 according to the eighth embodiment of the present disclosure. In this sealing device 140, the thickness of a central portion of the deformation member 136 is smaller than the thickness of the central portion of the deformation member 136 illustrated in FIG. 10. Furthermore, the thickness of the central portion of the deformation member 136 is smaller than the film thickness of the rotating seal member 18. Because of this, the elasticity of the central portion of the deformation member 136 is high.

Various embodiments of the present disclosure were described above, but these descriptions do not limit the present disclosure, and various modifications are considered including, deletion, addition, and replacing of components in the technical scope of the present disclosure.

For example, the shape of the fixed seal member 20 is not limited to that illustrated in the drawings. The present disclosure can be applied to a fixed seal member having a lip contacting the rotary shaft 14 and an axial dust lip contacting the rotating seal member 18, provided with a space similar to the space 52. For example, at least one of the side dust lips 34 and 36 may be omitted, or an additional lip may be added. The shape of the lips are also not limited to that illustrated in the drawings.

A number of the embodiments and variations described above may be combined as long as they do not contradict each other.

The characteristic that the portion corresponding to the opening 54 of the deformation member of the fifth embodiment (FIG. 7) being bellows-shaped may be applied to the deformation member 86 in the third embodiment (FIG. 5), the deformation member 116 in the sixth embodiment (FIG. 8), and the deformation member 136 in FIG. 11.

A projecting wall similar to the projecting wall 128 in the seventh embodiment (FIG. 9) may be provided around the opening 114 in the sixth embodiment (FIG. 8).

The shape of the deformation member 136 in the eight embodiment (FIG. 10, FIG. 11) may be applied to the deformation member 116 in the sixth embodiment (FIG. 8).

DESCRIPTION OF THE REFERENCE NUMERALS 10, 70, 80, 90, 100, 110, 120, 130 Sealing device
14 Rotary shaft
16 Shaft hole
18 Rotating seal member (deflector)
20 Fixed seal member
22 Elastic ring
24 Reinforcing ring
26 Outer side ring body
28 Inner side ring body
30 Side wall
32 Seal lip
34, 36 Side dust lip
38 Garter spring
40 Axial dust lip
46 Inner side tube portion
48 Side wall portion
50 Outer side tube portion
52 Space
54, 114, 124 Opening
56, 76, 86, 96, 106, 116, 126, 136 Deformation member
58 Step portion
60 Flange
128 Projecting wall
138 Groove

The invention claimed is:

1. A sealing device that seals between a shaft hole formed on a housing and a rotary shaft, comprising:
   a rotating seal member fixed to the rotary shaft that rotates integrally with the rotary shaft, and a fixed seal member fixed to an inner surface of the shaft hole;
   wherein the fixed seal member has a lip contacting the rotary shaft, and an axial dust lip contacting the rotating seal member;
   the rotating seal member is formed by a rigid body;
   an opening is formed on the rotating seal member connecting to a space defined by the rotary shaft, the lip and the axial dust lip of the fixed seal member, and the rotating seal member; and
   a deformation member formed from one of an elastomer or a bellows-shaped film is disposed on the opening of the rotating seal member, which blocks the opening, and deforms based on the pressure in the space.

2. The sealing device according to claim 1, wherein the opening is formed on a position not blocked by the rotary shaft.

3. The sealing device according claim 1, wherein the rotating seal member has an inner side tube portion fixed to the rotary shaft, an outer side tube portion disposed on an outer side of the inner side tube portion, and a side wall portion that connects the inner side tube portion and the outer side tube portion; the opening is formed on the side wall portion, and the deformation member is stretched from the inner circumferential surface of the inner side tube portion across the outer circumferential surface of the outer side tube portion.

4. The sealing device according to claim 1, wherein at least the portion of the deformation member covering the opening is bellows-shaped.

\* \* \* \* \*